(12) United States Patent
Kaji (10) Patent No.: US 8,997,810 B2
(45) Date of Patent: Apr. 7, 2015

(54) PNEUMATIC TIRE WITH TREAD HAVING NOTCH PORTIONS IN SHOULDER BLOCK

(75) Inventor: Shinichi Kaji, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 1014 days.

(21) Appl. No.: 12/598,237

(22) PCT Filed: May 8, 2008

(86) PCT No.: PCT/JP2008/058516
§ 371 (c)(1),
(2), (4) Date: Oct. 30, 2009

(87) PCT Pub. No.: WO2008/143001
PCT Pub. Date: Nov. 27, 2008

(65) Prior Publication Data
US 2010/0116394 A1 May 13, 2010

(30) Foreign Application Priority Data
May 11, 2007 (JP) ................................. 2007-126732

(51) Int. Cl.
*B60C 11/11* (2006.01)
*B60C 11/03* (2006.01)

(52) U.S. Cl.
CPC ............. *B60C 11/11* (2013.01); *B60C 11/0306* (2013.04); *B60C 2011/0381* (2013.04)

(58) Field of Classification Search
CPC ............... B60C 11/0306; B60C 11/11; B60C 2011/0381

USPC ................................ 152/209.18, 902, DIG. 3
See application file for complete search history.

(56) References Cited

U.S. PATENT DOCUMENTS

| | | | | |
|---|---|---|---|---|
| 5,031,680 A | * | 7/1991 | Kajikawa et al. | 152/209.21 |
| 5,044,414 A | * | 9/1991 | Ushikubo | 152/209.24 |
| 5,355,922 A | * | 10/1994 | Kogure et al. | 152/209.18 |
| 6,378,583 B1 | * | 4/2002 | Fontaine | 152/209.18 |
| 2008/0047641 A1 | * | 2/2008 | Takahashi | 152/209.3 |
| 2008/0302457 A1 | * | 12/2008 | Byrne | 152/209.18 |

FOREIGN PATENT DOCUMENTS

| | | |
|---|---|---|
| DE | 8708747 U1 * | 10/1987 |
| EP | 339335 A2 | 11/1989 |
| EP | 1 034 945 | 9/2000 |
| EP | 1048488 A2 * | 11/2000 |

(Continued)

OTHER PUBLICATIONS

Machine translation for Japan 2004-359150 (no date).*

(Continued)

*Primary Examiner* — Steven D Maki
(74) *Attorney, Agent, or Firm* — Fish & Richardson P.C.

(57) ABSTRACT

A pneumatic tire has a tread pattern having shoulder blocks arranged in a tire circumferential direction in a shoulder portion of a tread surface, and slits to sectionalize the shoulder blocks. Slit wall surfaces in a trailing side and a leading side of the shoulder blocks are inclined to the slit side from both end portions in a width direction of the shoulder block toward a center portion in the width direction. A notch portion is provided in the center portion in the width direction in the slit wall surface in the trailing side or the leading side of the shoulder block.

2 Claims, 4 Drawing Sheets

(56) References Cited

FOREIGN PATENT DOCUMENTS

| EP | 1127716 B1 | | | 8/2001 |
|---|---|---|---|---|
| JP | 04-038208 A | * | 2/1992 |
| JP | 04-274907 A | * | 9/1992 |
| JP | 05-278416 | | | 10/1993 |
| JP | 07-266809 | | | 10/1995 |
| JP | 07-266809 A | * | 10/1995 |
| JP | 08-067113 A | * | 3/1996 |
| JP | 2001-30715 | | | 2/2001 |
| JP | 2004-58889 | | | 2/2004 |
| JP | 2004-359150 A | * | 12/2004 |
| JP | 2006-137230 | | | 6/2006 |
| JP | 2006-143134 | | | 6/2006 |
| JP | 2006-335282 | | | 12/2006 |
| SU | 1382669 A | * | 3/1988 |
| WO | WO 00/06398 | | | 2/2000 |

OTHER PUBLICATIONS

Machine translation for Japan 08-067113 (no date).*
Machine translation for Japan 07-266809 (no date).*
Translation for Japan 04-274907 (no date).*
Machine translation for German 8,708,747 (no date).*
Form PCT/IB/338 Notification of Transmittal of Translation of the IPER (Dec. 3, 2009).
Form PCT/IB/373 International Preliminary Report on Patentability (IPER) (Nov. 24, 2009).
European Communication for Application No. 08752407.0 dated Dec. 27, 2010, 4 pages.

* cited by examiner

PNEUMATIC TIRE WITH TREAD HAVING NOTCH PORTIONS IN SHOULDER BLOCK

TECHNICAL FIELD

The present invention relates to a pneumatic tire provided with a tread pattern having shoulder blocks which are arranged in a tire circumferential direction in a shoulder portion of a tread surface, and slits which sectionalize the shoulder blocks.

BACKGROUND ART

Generally, in the pneumatic tire provided with a lot of blocks in the tread surface, there is a tendency that a heel and toe wear is generated by a difference in a wear amount between a trailing side and a leading side of the block, due to a deformation at a time of rolling, and the heel and toe wear is particularly remarkable in the shoulder block arranged in the shoulder portion.

Conventionally, for the purpose of reducing the heel and toe wear, there has been employed a method of lifting up the bottom of the slits (the transverse grooves) sectionalizing the shoulder blocks so as to make the slit shallow, and enhancing a rigidity of the blocks so as to reduce a deformation. However, in this method, since a decay time of the slit is anticipated by the wear of the tread portion, there is generated a problem for maintaining a traction performance and a drainage performance.

On the contrary, the following Patent Documents 1 and 2 describe a method of forming a peculiar shape in which an angle of a slit wall surface (a groove wall angle) with respect to a tire diametrical direction of the block is different from each other between a trailing side and a leading side, and controlling a deforming degree of the block or the like in such a manner as to be advantageous to a heel and toe wear resistance. However, an effect of improving the heel and toe wear resistance according to the method mentioned above appears in the early stage of the wear, however, tends to fade with the reduction of the peculiar shape in the slit wall surface of the block in the stage that the wear of the tread portion makes progress.

Patent Document 1: Japanese Unexamined Patent Publication No. 2006-137230
Patent Document 2: Japanese Unexamined Patent Publication No. 2004-58889

DISCLOSURE OF THE INVENTION

Problems to be Solved by the Invention

The present invention is made in view of the above circumstances, and an object thereof is to provide a pneumatic tire which can inhibit a heel and toe wear from being generated in a shoulder block while maintaining a traction performance and a drainage performance, and can secure a heel and toe wear resistance regardless of a progress state of a wear of the tread portion.

Means for Solving the Problems

Figure 7:
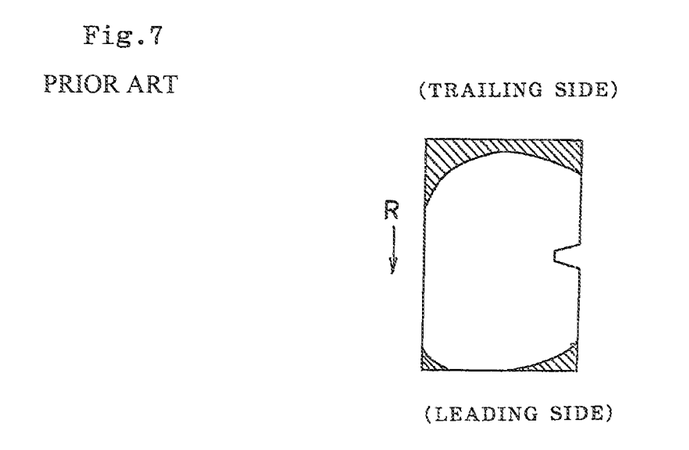
FIG. 7 is a conceptual view showing a distribution of a friction energy generated in the shoulder block in the conventional tire.

The inventor has devoted himself to repeatedly make a study for achieving the object mentioned above, and has found that an amount of deformation is greater in both end portions in a width direction than in the center portion in the width direction of the shoulder block, in the trailing side and the leading side of the shoulder block, a distribution of a friction energy generated in connection with the rolling motion of the tire is uneven as shown in FIG. 7, and an amount of wear is relatively great in the both end portions in the width direction, whereby the heel and toe wear is generated. The present invention is made by paying attention to the uneven distribution of the friction energy, and can achieve the object mentioned above based on the following structure.

That is, the present invention provides a pneumatic tire provided with a tread pattern having shoulder blocks which are arranged in a tire circumferential direction in a shoulder portion of a tread surface, and slits which sectionalize the shoulder blocks, wherein slit wall surfaces in a trailing side and a leading side of the shoulder blocks are inclined to the slit side from both end portions in a width direction of the shoulder block toward a center portion in the width direction.

According to the pneumatic tire of the present invention, since the slit wall surfaces in the trailing side and the leading side of the shoulder block are inclined to the slit side from both end portions in the width direction of the shoulder block toward the center portion in the width direction, it is possible to enhance the friction energy in the trailing side and the leading side of the shoulder block in the center portion in the width direction. Further, since a total amount of the friction energy generated within the block is not changed as far as ground conditions such as a pneumatic pressure, a load and the like are the same, it is possible to lower the friction energy in both end portions in the width direction according to enhancement of the friction energy in the center portion in the width direction, whereby it is possible to uniformize the friction energy in the trailing side and the leading side of the shoulder block along the slit wall surface. As a result, it is possible to inhibit the heel and toe wear from being generated in the shoulder block by lowering the friction energy in the both end portions in the width direction which tend to become locally higher, and lowering the difference of the amount of wear between the trailing side and the leading side of the shoulder block.

Further, according to the present invention, since it is not necessary to lift up the bottom of the slit so as to make the slit shallow, it is possible to suitably maintain the traction performance and the drainage performance. Further, since the effect of improving the heel and toe wear resistance achieved by the present invention is not greatly affected by the wearing state of the shoulder block, it is possible to well secure the heel and toe wear resistance even in the stage that the wear of the tread portion makes progress as well as the early stage of wear.

In the above structure, it is preferable that the slit wall surfaces in the trailing side and the leading side of the shoulder block include a first ridge line linearly extending obliquely to the slit side from a portion which is in the vicinity of a side wall surface in an inner side in a tire width direction of the shoulder block toward the center portion in the width direction, and a second ridge line linearly extending obliquely to the slit side from a portion which is in the vicinity of a ground end of the tread surface toward the center portion in the width direction of the shoulder block.

According to the structure mentioned above, since the slit wall surfaces in the trailing side and the leading side of the shoulder block include the first ridge line and the second ridge line as mentioned above, it is possible to securely lower the friction energy in the trailing side and the leading side of the shoulder block at the both end portions in the width direction, whereby it is possible to suitably achieve a uniformizing operation of the friction energy mentioned above, and it is possible to effectively inhibit the heel and toe wear from being generated.

In the above structure, it is preferable that center portion side ends of the first ridge line and the second ridge line are arranged in a region which is ±10% the width of the shoulder block based on a bisector bisecting the shoulder block in the tire width direction.

In the present invention, if the portion enhancing the friction energy comes close to the end portion in the width direction of the shoulder block, the effect of lowering the friction energy in the both end portions in the width direction becomes small, and the uniformizing operation of the friction energy as mentioned above tends to become smaller. Therefore, according to the structure of the present invention, it is possible to securely enhance the friction energy in the center in the width direction of the shoulder block in which the friction energy tends to become lower, whereby it is possible to suitably achieve the uniformizing operation of the friction energy, and it is possible to effectively inhibit the heel and toe wear from being generated.

In the above structure, it is preferable that angles of inclination of the first ridge line and the second ridge line with respect to the tire width direction are between 1 and 7°.

According to the structure mentioned above, it is possible to suitably achieve a uniformizing operation of the friction energy mentioned above, and it is possible to effectively inhibit the heel and toe wear from being generated. In other words, if the angle of inclination is less than 1°, the effect of enhancing the friction energy in the trailing side and the leading side of the shoulder block in the center portion in the width direction becomes smaller. Accordingly, a uniformity of the friction energy tends to be lowered. On the other hand, if the angle of inclination is more than 7°, the effect of enhancing the friction energy in the center portion in the width direction becomes bigger too much. Accordingly, the uniformity of the friction energy tends to be lowered.

As a preferable embodiment according to the present invention, there can be listed up a structure in which a notch portion is provided in the center portion in the width direction of the slit wall surface in the trailing side or the leading side of the shoulder block. Further, it is preferable that the notch portion is interposed between an end of the first ridge line close to the center portion and an end of the second ridge line close to the center portion. According to the structure mentioned above, since a concentration degree of the friction energy can be reduced by the notch portion, it is possible to inhibit the friction energy from becoming too high in the center portion in the width direction of the slit wall surface of the shoulder block.

DESCRIPTION OF REFERENCE SYMBOLS

1 Shoulder block
2 Slit
11 Trailing side slit wall surface
11a First ridge line included in trailing side slit wall surface
11b Second ridge line included in trailing side slit wall surface
12 Leading side slit wall surface
12a First ridge line included in leading side slit wall surface
12b Second ridge line included in leading side slit wall surface
E Ground end
L Bisector
R Rotating direction of tire

BEST MODE FOR CARRYING OUT THE INVENTION

Figure 1:
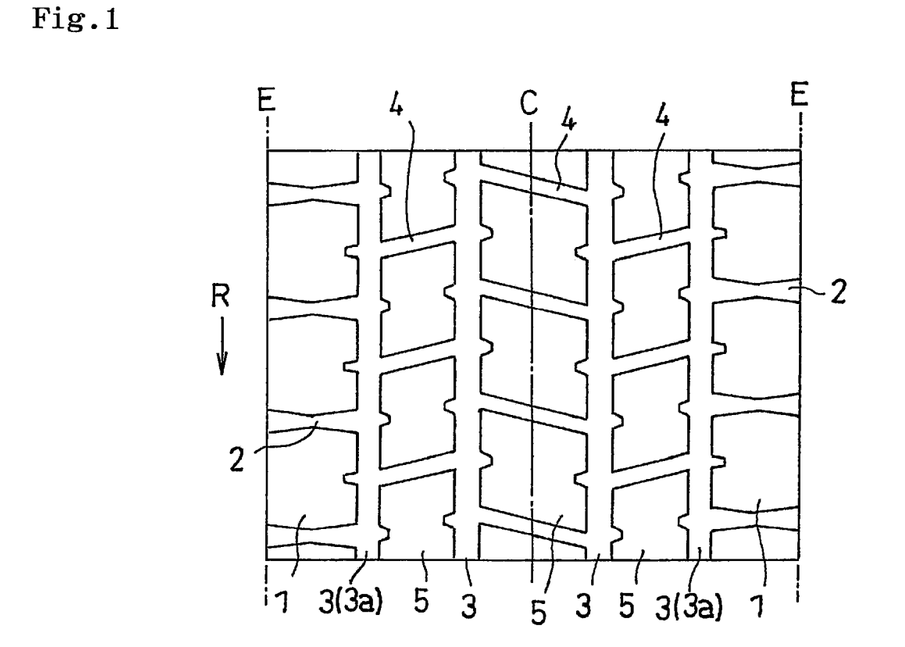
FIG. 1 is a plan view showing an example of a tread pattern of the pneumatic tire of the present invention.
Figure 2:
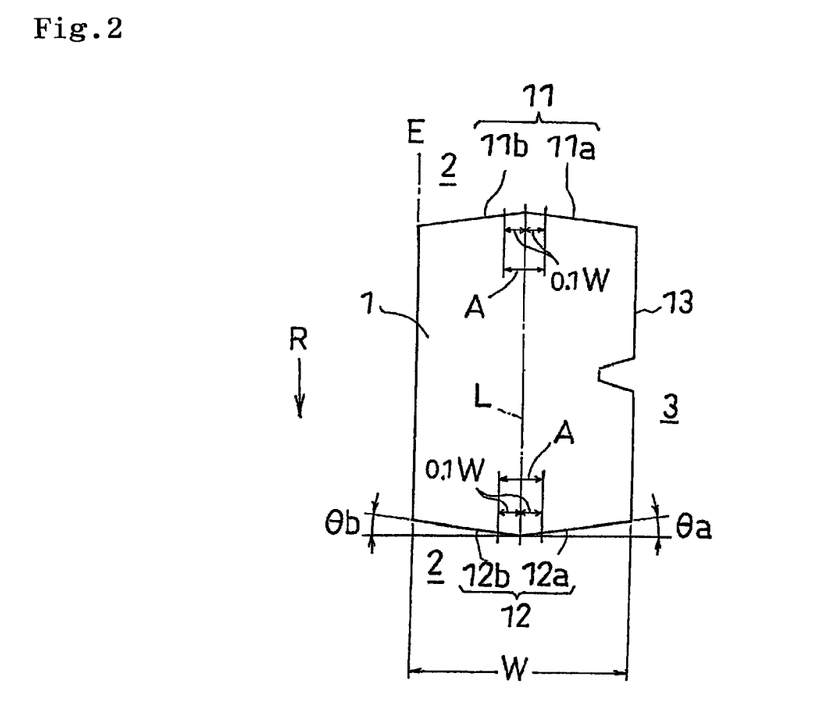
FIG. 2 is an enlarged view of a shoulder block.

An embodiment of the present invention will be explained with reference to the drawings. FIG. 1 is a plan view showing an example of a tread pattern of the pneumatic tire of the present invention. FIG. 2 is an enlarged view of a shoulder block included by the tread pattern. The pneumatic tire according to the present invention is provided with the tread pattern having shoulder blocks 1 which are arranged in a tire circumferential direction in a shoulder portion of the tread surface, and slits 2 which sectionalize the shoulder blocks 1 from each other, as shown in FIG. 1.

In the present embodiment, four main grooves 3 extending linearly in the tire circumferential direction are provided, and the slits 2 intersect in relation to the main grooves 3 approximately vertically while changing their groove widths. The shoulder blocks 1 are provided in an outer side of a main groove 3a positioned in an outermost side in a tire width direction of four main grooves 3, and the other land portion than the shoulder blocks 1 is sectionalized into three rows of blocks 5 by slits 4 extending obliquely in response to the main groove 3. In this case, reference symbol C denotes a tire equator line, reference symbol E denotes a ground end, and an arrow R denotes a rotating direction of the tire.

The shoulder block 1 shown in an enlarged manner in FIG. 2 is a shoulder block provided in a left side in FIG. 1. This shoulder block 1 is structured such that a slit wall surface 11 in a trailing side and a slit wall surface 12 in a leading side are inclined to the slit 2 side respectively from both end portions in a width direction of the shoulder block 1 toward the center portion in the width direction, that is, from both left and right sides in FIG. 2 toward the center, and is formed into a V-shaped form protruding to the slit 2 side.

Figure 3:
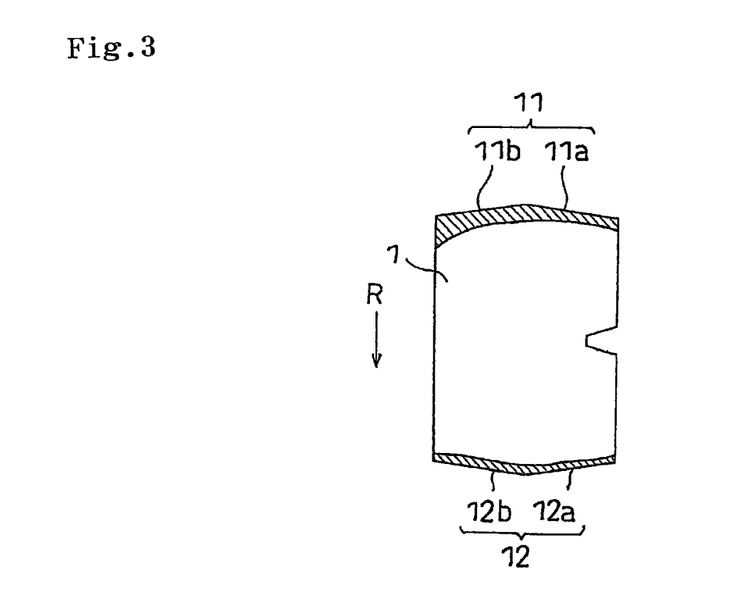
FIG. 3 is a conceptual view showing a distribution of a friction energy generated in the shoulder block in the present invention.

Accordingly, it is possible to enhance a friction energy in the trailing side and the leading side of the shoulder block 1 in the center portion in the width direction, and it is possible to lower the friction energy in both end portions in the width direction going therewith so as to uniformize the friction energy in the trailing side and the leading side of the shoulder block 1 along the slit wall surfaces 11 and 12 as shown in FIG. 3. As a result, it is possible to inhibit the heel and toe wear from being generated in the shoulder block 1 by lowering the friction energy in the both end portions in the width direction which tend to become locally higher, and lowering the difference of the amount of wear between the trailing side and the leading side of the shoulder block 1.

In this case, FIG. 3 is a conceptual view showing a distribution of a friction energy generated in connection with a rolling motion of the tire, in which a hatching is given to a region to which a great friction energy is applied in a motion that the shoulder block 1 steps on a road surface so as to ground and thereafter kicks out the road surface so as to come away from the road surface. In FIG. 3, there is expressed the matter that a thickness of the hatched region is approximately uniform along the slit wall surfaces 11 and 12, and the applied friction energy is uniformized. On the other hand, FIG. 7 mentioned above is a similar conceptual view, however, the hatched region is thick on the outer side in the width direction and thin in the center portion in the width direction, and FIG. 7 expresses that the distribution of the friction energy is uneven.

The slit wall surface 11 in the trailing side of the shoulder block 1 includes a first ridge line 11a linearly extending obliquely to the slit 2 side from a portion which is in the vicinity of the side wall surface 13 in the inner side in the tire width direction of the shoulder block 1 toward the center portion in the width direction, and a second ridge line 11b linearly extending obliquely to the slit 2 side from a portion which is in the vicinity of the ground end E toward the center portion in the width direction of the shoulder block 1. In the same manner, the slit wall surface 12 includes a first ridge line 12a and a second ridge line 12b. Accordingly, it is possible to securely lower the friction energy in the trailing side and the leading side of the shoulder block 1 at the both end portions in the width direction, whereby it is possible to suitably achieve a uniformizing operation of the friction energy mentioned above, and it is possible to effectively inhibit the heel and toe wear from being generated.

If the end portions in the width direction of the slit wall surfaces 11 and 12 are formed such as to protrude to the slit 2 side, there is a tendency that it becomes hard to lower the friction energy of the end portions in the width direction. Further, if the end portions in the width direction extend in parallel to the tire width direction, there is a tendency that the effect of lowering the friction energy of the end portions in the width direction becomes small. Accordingly, it is preferable that ends close to the end portions of the first ridge lines 11a and 12a (ends arranged in the end portions in the width direction of the shoulder block 1) reach the side wall surface 13 of the shoulder block 1, and ends close to the end portions of the second ridge lines 11b and 12b reach the ground end E, like the present embodiment.

In the present invention, it is preferable that center portion side ends of the first ridge line 11a and 12a and the second ridge line 11b and 12b (ends arranged in the center portion in the width direction of the shoulder block 1) are arranged in a region A which is ±10% the width W of the shoulder block 1 based on a bisector L bisecting the shoulder block 1 in the tire width direction. Accordingly, it is possible to securely enhance the friction energy in the center in the width direction of the shoulder block 1 in which the friction energy tends to become lower, whereby it is possible to suitably achieve the uniformizing operation of the friction energy, and it is possible to effectively inhibit the heel and toe wear from being generated.

An angle θa of inclination of the first ridge line 12a of the slit wall surface 12 with respect to the tire width direction, and an angle θb of inclination of the second ridge line 12b with respect to the tire width direction are preferably between 1 and 7°, and more preferably between 3 and 7°. Accordingly, it is possible to suitably achieve a uniformizing operation of the friction energy mentioned above, and it is possible to effectively inhibit the heel and toe wear from being generated. The angle θa of inclination and the angle θb of inclination may be identical, however, may be different from each other. These matters are the same in the first ridge line 11a and the second ridge line 11b of the slit wall surface 11.

The pneumatic tire in accordance with the present invention is similar to a normal pneumatic tire except provision of the tread pattern with the shoulder block and slit as mentioned above, and it is possible to employ the conventionally known material, shape, structure, manufacturing method and the like to the present invention.

The present invention is not limited to the embodiment mentioned above, but can be improved and modified variously within the scope of the present invention. Accordingly, for example, the other tread patterns than that shown in FIG. 1 may be employed, and the shapes according to the slit wall surfaces 11 and 12 of the shoulder block 1 mentioned above may be applied to the other blocks than the shoulder block. Further, the shape of the shoulder block is not limited to the shape shown in the embodiment mentioned above as far as the slit wall surfaces in the trailing side and the leading side are inclined as mentioned above, for example, the side wall surface facing the main groove may be inclined with respect to the tire circumferential direction.

Figure 4:
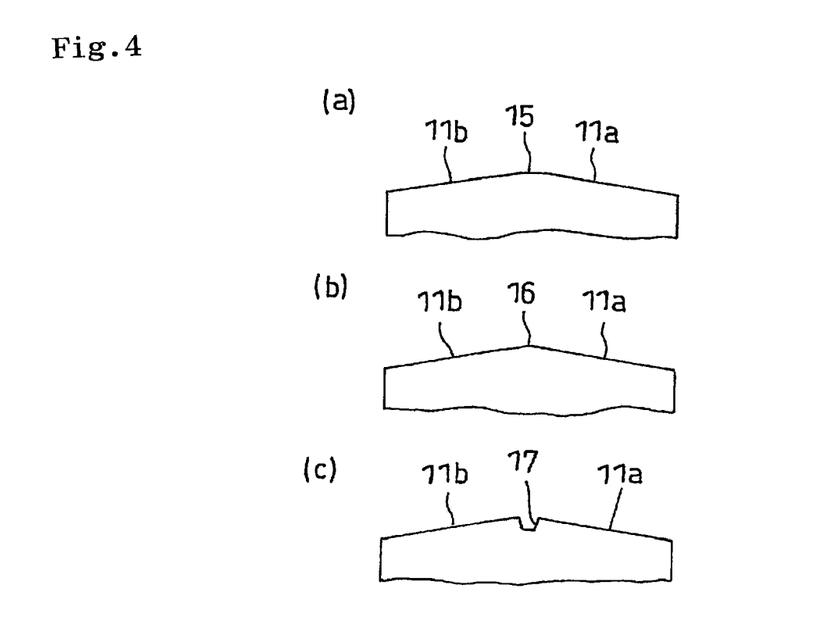
FIG. 4 is a view showing a slit wall surface of a shoulder block according to another embodiment of the present invention.

In the embodiment mentioned above, there is shown the example in which the slit wall surface 11 of the shoulder block 1 is formed such as to confront the center portion side end of the first ridge line 11a with the center portion side end of the second ridge line 11b, however, the present invention is not limited thereto, but may be formed as shown in FIGS. 4(a), 4(b) and 4(c). In the examples in FIGS. 4(a), 4(b) and 4(c), a flat end portion 15 which is in parallel to the tire width direction (FIG. 4(a)), a circular arc portion 16 (FIG. 4(b)) or a notch portion 17 (FIG. 4(c)) is interposed between the center portion side end of the first ridge line 11a and the center portion side end of the second ridge line 11b, whereby it is possible to inhibit the friction energy of the center portion in the width direction in the trailing side from excessively increasing. Even in this case, it is preferable that the center portion side end of each of the ridge lines 11a and 11b is arranged within the region A mentioned above. These matters are similar with regard to the slit wall surface 12 in the leading side.

FIGS. 5(a), 5(b), 5(c) and 5(d) show the other examples according to an embodiment in which the notch portion is provided in the center portions in the width direction of the slit wall surfaces 11 and 12 in the trailing side and the leading side of the shoulder block 1. FIG. 4(c) shows the example in which the trapezoidal notch portion 17 is provided, however, in FIGS. 5(a), 5(b), 5(c) and 5(d), a triangular notch portion 18 (FIG. 5(a)), an oval notch portion 19 (FIG. 5(b)), a semi-circular notch portion 20 (FIG. 5(c)) or a saw-tooth notch portion 21 (FIG. 5(d)) is interposed between the center portion side end of the first ridge line 11a and the center portion side end of the second ridge line 11b.

It is preferable that each of the notch portions 17 to 21 is arranged within the region A mentioned above. If the set region of the notch portion is as wide as to protrude from the region A, the region enhancing the friction energy is lost in the center portion in the width direction of the slit wall surfaces 11 and 12, and it becomes hard to achieve the operation for uniformizing the friction energy. Further, in the case that the set region of the notch portion is wide, an angle formed by the slit wall surfaces 11 and 12 and the notch portion tends to be obtuse, and the area of the shoulder block 1 is reduced. Accordingly, a wear resistance tends to be lowered.

It is preferable that a depth d of each of the notch portions 17 to 21 is within 10 mm. Accordingly, it is possible to prevent the friction energy from being excessively concentrated at the set position of the notch portion, and it is possible to prevent the wear resistance from being lowered due to an excessive enlargement of the notch portion. The notch portion can be set in the slit wall surface in any one of the trailing side and the leading side of the shoulder block 1.

Figure 5:
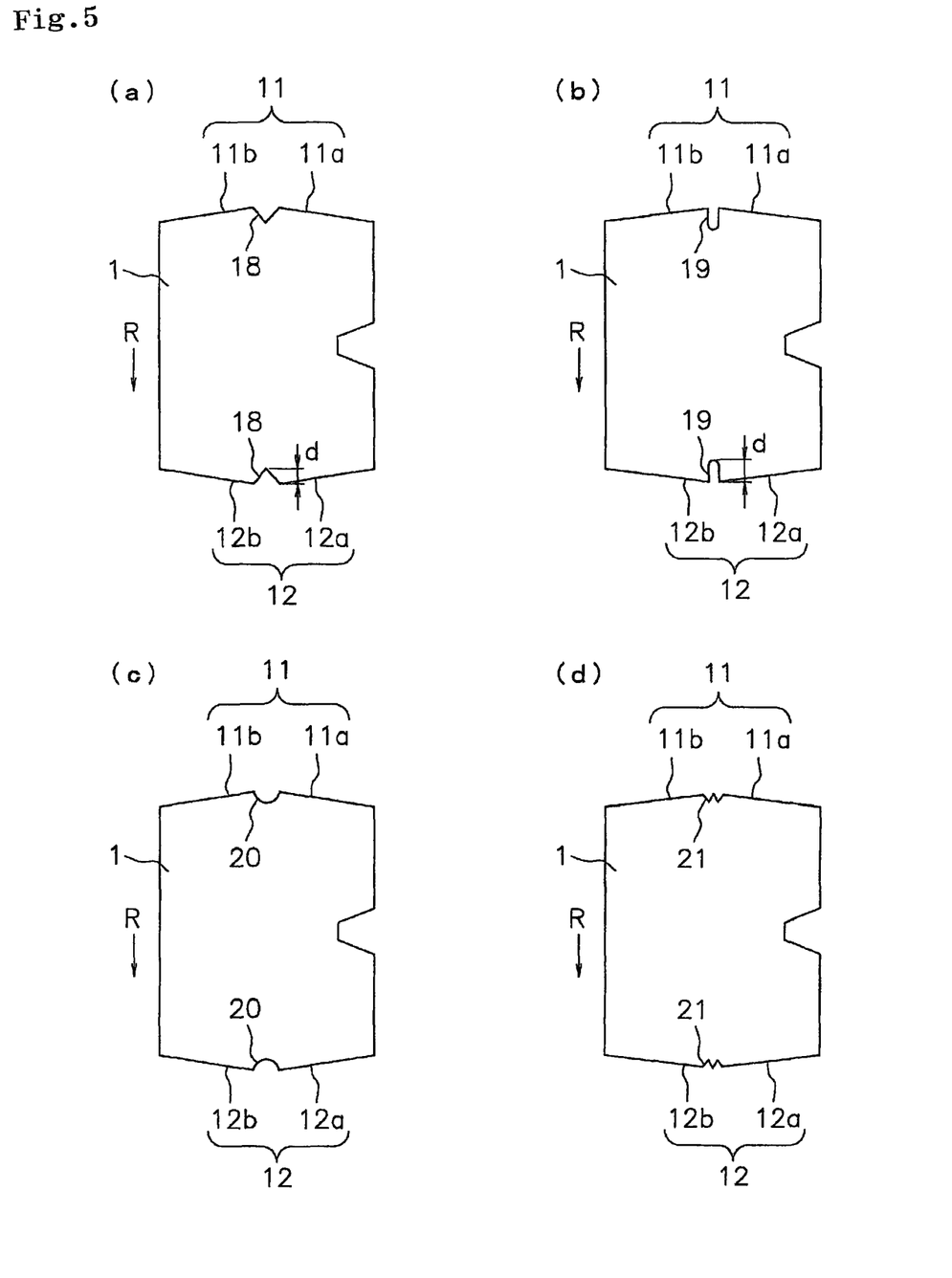
FIG. 5 are an enlarged view of a shoulder block according to another embodiment of the present invention.

As a shape of the notch portion, a shape extending at a fixed width along a depth direction such as the notch portion 19 in FIG. 5(b) is preferable. According to the shape, since an angle formed by the slit wall surfaces 11 and 12 and the notch portion does not change in correspondence to a width and a depth of the notch portion, it is easy to control the operation for absorbing the friction energy by the notch portion. Further, it is advantageous in comparison with the other shapes in the way that the effect mentioned above can be obtained without enlarging the volume of the notch portion very much. On the contrary, in the shape such as the notch portion 18 in FIG. 5(a), since an angle formed by the slit wall surfaces 11 and 12 and the notch portion changes in correspondence to the width and the depth of the notch portion, a rigidity change at the set position of the notch portion is involved, and it is comparatively hard to control the operation for absorbing the friction energy.

EXAMPLE

Figure 6:
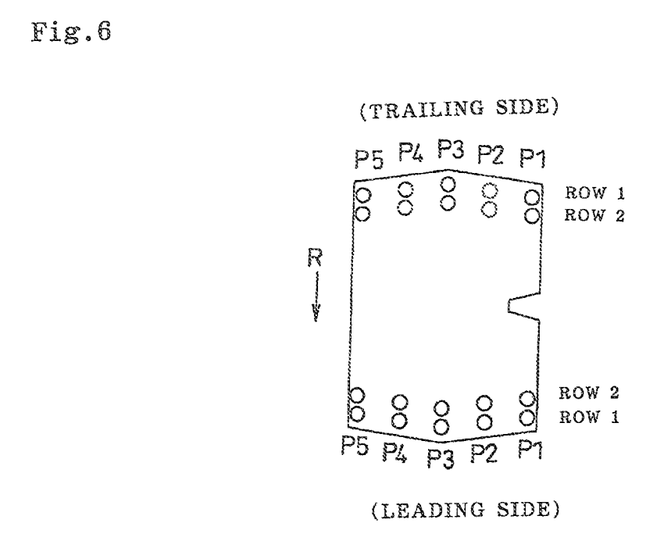
FIG. 6 is an explanatory view of a measuring point of a friction energy.

A description will be given below of a test with regard to the friction energy generated in the shoulder block, the test being executed for specifically indicating the structure and the effect of the present invention. In the test, the tire was rolled on a table, a ground pressure and a displacement (a slipping amount) on the surface of the shoulder block at that time were measured by a sensor, and a friction energy was calculated. Measuring points were set to 20 points indicated by circle marks in FIG. 6, and a row 1 and a row 2 were respectively set to the measuring points close to the slit and the measuring points away from the slit at five positions P1 to P5 heading for a left side from a right side in FIG. 6, in each of the trailing side and the leading side. Further, a pneumatic pressure of the tire was set to 850 kPa, a load was set to 2725 kgf, a slip angle was set to 0.2°, a camber angle was set to 0°, and a driving and braking force was set to −1202 N.

Comparative Example and Examples 1 to 4

In a tire of a size 11R22.5 14PR provided with the tread pattern shown in FIG. 1, angles θa and θb of inclination of the slit wall surface with respect to the tire width direction are set to values indicated in Table 1, and a comparative example and examples 1 to 4 are provided. In this case, since a relation θa=θb=0° is established in the comparative example, the shoulder block has a shape shown in FIG. 7. Results of test in the trailing side are shown in Table 2, and results of test in the leading side are shown in Table 3.

TABLE 1

| | | Comparative example | Example 1 | Example 2 | Example 3 | Example 4 |
|---|---|---|---|---|---|---|
| Angle of inclination (°) | θa | 0 | 0.7 | 2.5 | 7 | 10 |
| | θb | 0 | 0.7 | 2.5 | 7 | 10 |

TABLE 2

| Trailing side | | Friction energy (J/mm$^2$) | | | | | standard deviation |
|---|---|---|---|---|---|---|---|
| | | P1 | P2 | P3 | P4 | P5 | |
| Comparative example | Row 1 | 118 | 102 | 96 | 97 | 101 | 8.87 |
| | Row 2 | 98 | 90 | 82 | 92 | 95 | |

TABLE 2-continued

| Trailing side | | Friction energy (J/mm$^2$) | | | | | standard deviation |
|---|---|---|---|---|---|---|---|
| | | P1 | P2 | P3 | P4 | P5 | |
| Example 1 | Row 1 | 108 | 97 | 98 | 101 | 96 | 5.93 |
| | Row 2 | 94 | 92 | 88 | 90 | 88 | |
| Example 2 | Row 1 | 98 | 96 | 92 | 94 | 97 | 2.91 |
| | Row 2 | 93 | 91 | 89 | 90 | 91 | |
| Example 3 | Row 1 | 98 | 94 | 100 | 96 | 101 | 4.25 |
| | Row 2 | 94 | 90 | 94 | 88 | 89 | |
| Example 4 | Row 1 | 100 | 102 | 115 | 96 | 98 | 7.65 |
| | Row 2 | 91 | 95 | 96 | 89 | 86 | |

TABLE 3

| Leading side | | Friction energy (J/mm$^2$) | | | | | Standard deviation |
|---|---|---|---|---|---|---|---|
| | | P1 | P2 | P3 | P4 | P5 | |
| Comparative example | Row 1 | 89 | 68 | 40 | 36 | 80 | 23.73 |
| | Row 2 | 78 | 52 | 22 | 18 | 65 | |
| Example 1 | Row 1 | 72 | 58 | 48 | 43 | 75 | 14.15 |
| | Row 2 | 66 | 49 | 35 | 32 | 61 | |
| Example 2 | Row 1 | 64 | 63 | 58 | 60 | 62 | 3.59 |
| | Row 2 | 57 | 55 | 52 | 57 | 61 | |
| Example 3 | Row 1 | 52 | 55 | 64 | 60 | 55 | 7.60 |
| | Row 2 | 43 | 42 | 52 | 44 | 41 | |
| Example 4 | Row 1 | 46 | 58 | 91 | 71 | 54 | 18.65 |
| | Row 2 | 37 | 34 | 83 | 45 | 41 | |

From Tables 2 and 3, in the comparative example, the friction energy is higher in both end portions in the width direction than the center portion in the width direction, and the standard deviation is comparatively large. On the contrary, in the examples 1 to 4, the friction energy in the center portion in the width direction is higher in comparison with the comparative example, the friction energy in both end portions in the width direction becomes low, and the standard deviation is comparatively small. Accordingly, in the examples 1 to 4, it is known that the friction energy generated in the shoulder block in connection with the rolling motion of the tire can be uniformized. Further, in the examples 1 to 4, a difference of friction energy between the trailing side and the leading side becomes smaller in connection with the uniformizing of the friction energy. Accordingly, it is known that it is possible to reduce the difference of wear amount between the trailing side and the leading side so as to inhibit the heel and toe wear from being generated. Particularly, in the examples 2 and 3, the more excellent effect can be obtained than the other, and it is known that the angles θa and θb of inclination are preferably between 1 and 7°.

Examples 5 to 8

Examples 5 to 7 are set to the example 3 mentioned above provided with the notch portion shown in FIG. 5(a), and an example 8 is set to the example 3 provided with the notch portion shown in FIG. 5(b). The angles θa and θb of inclination, and the width and the depth of the notch portion are respectively set to values shown in Table 4. Table 4 describes the results of the example 3 together for comparing with the examples 5 to 8. Results of test in the trailing side are shown in Table 5, and results of test in the leading side are shown in Table 6.

TABLE 4

|  |  | Example 3 | Example 5 | Example 6 | Example 7 | Example 8 |
|---|---|---|---|---|---|---|
| Angle of inclination (°) | θa | 7 | 7 | 7 | 7 | 7 |
|  | θb | 7 | 7 | 7 | 7 | 7 |
| Width of notch portion |  | 0 | 0.16 W | 0.16 W | 0.16 W | 0.16 W |
| Depth of notch portion (mm) |  | 0 | 8 | 10 | 12 | 10 |

TABLE 5

| Trailing side |  | Friction energy (J/mm²) | | | | | Standard deviation |
|---|---|---|---|---|---|---|---|
|  |  | P1 | P2 | P3 | P4 | P5 |  |
| Example 3 | Row 1 | 98 | 94 | 100 | 96 | 101 | 4.25 |
|  | Row 2 | 94 | 90 | 94 | 88 | 89 |  |
| Example 5 | Row 1 | 99 | 94 | 91 | 93 | 98 | 2.98 |
|  | Row 2 | 93 | 91 | 90 | 90 | 92 |  |
| Example 6 | Row 1 | 98 | 93 | 89 | 92 | 94 | 2.88 |
|  | Row 2 | 94 | 90 | 87 | 92 | 92 |  |
| Example 7 | Row 1 | 92 | 93 | 103 | 94 | 98 | 4.33 |
|  | Row 2 | 91 | 91 | 98 | 88 | 90 |  |
| Example 8 | Row 1 | 97 | 92 | 87 | 94 | 94 | 2.76 |
|  | Row 2 | 95 | 92 | 89 | 94 | 92 |  |

TABLE 6

| Leading side |  | Friction energy (J/mm²) | | | | | standard deviation |
|---|---|---|---|---|---|---|---|
|  |  | P1 | P2 | P3 | P4 | P5 |  |
| Example 3 | Row 1 | 52 | 55 | 64 | 60 | 55 | 7.60 |
|  | Row 2 | 43 | 42 | 52 | 44 | 41 |  |
| Example 5 | Row 1 | 63 | 59 | 56 | 61 | 62 | 3.46 |
|  | Row 2 | 56 | 52 | 54 | 58 | 61 |  |
| Example 6 | Row 1 | 62 | 60 | 58 | 57 | 59 | 3.38 |
|  | Row 2 | 57 | 51 | 52 | 57 | 61 |  |
| Example 7 | Row 1 | 53 | 55 | 72 | 65 | 62 | 7.96 |
|  | Row 2 | 47 | 48 | 69 | 58 | 60 |  |
| Example 8 | Row 1 | 61 | 62 | 58 | 55 | 57 | 3.23 |
|  | Row 2 | 63 | 53 | 56 | 60 | 62 |  |

As shown in Tables 5 and 6, in the examples 5, 6 and 8, the friction energy in the center portion in the width direction is lower than the example 3, and the standard deviation thereof is comparatively small. Accordingly, it is known that it is possible to inhibit the friction energy from being excessively increased in the center portion in the width direction by setting the notch portion, and it is possible to more suitably achieve the uniformizing operation of the friction energy. Further, in the example 7 in which the depth of the notch portion is set to 12 mm, since the friction energy is concentrated at the set position of the notch portion, it is known that the depth of the notch portion is preferably within 10 mm.

The invention claimed is:

1. A pneumatic tire provided with a tread pattern having shoulder blocks which are arranged in a tire circumferential direction in a shoulder portion of a tread surface, and slits which sectionalize the shoulder blocks, wherein
    slit wall surfaces in a trailing side and a leading side of the shoulder blocks are inclined to the slit side from both end portions in a width direction of the shoulder block toward a center portion in the width direction, and a notch portion is provided in the center portion in the width direction in the slit wall surface in both the trailing side and the leading side of the shoulder block,
    the slit wall surfaces in the trailing side and the leading side of the shoulder block include a first ridge line linearly extending obliquely to the slit side from a portion which is in the vicinity of a side wall surface in an inner side in a tire width direction of the shoulder block toward the center portion in the width direction, and a second ridge line linearly extending obliquely to the slit side from a portion which is in the vicinity of a ground end of the tread surface toward the center portion in the width direction of the shoulder block,
    the notch portion is interposed only between the center portion side end of the first ridge line and the center portion side end of the second ridge line and has a depth (d) of up to 10 mm in the circumferential direction of the tire,
    angles of inclination of the first ridge line and the second ridge line with respect to the tire width direction are between 1 and 7°, and each notch portion has an open end at the slit and a curved concave closed end in the shoulder block, and each notch portion has a fixed width along the circumferential direction from the open end to the closed end so that frictional energy is uniformed in the trailing side and the leading side of the shoulder block along the slit wall surface.

2. The pneumatic tire according to claim 1, wherein center portion side ends of the first ridge line and the second ridge line are arranged in a region which is ±10% the width of the shoulder block based on a bisector bisecting the shoulder block in the tire width direction.

\* \* \* \* \*